US005316776A

United States Patent [19]

Annuk et al.

[11] Patent Number: 5,316,776

[45] Date of Patent: May 31, 1994

[54] FERMENTATION METHOD

[75] Inventors: David Annuk, Baulkham Hills; Peter L. Voigt, Wodonga; Sameul F. Marshall, Cheltenham, all of Australia

[73] Assignee: Arnott's Biscuits Limited, Homebush, Australia

[21] Appl. No.: 311,426

[22] Filed: Feb. 14, 1989

Related U.S. Application Data

[63] Continuation of Ser. No. 59,109, Jun. 8, 1987, abandoned, which is a continuation-in-part of Ser. No. 696,023, Jan. 29, 1985, abandoned.

[30] Foreign Application Priority Data

Jan. 31, 1984 [AU] Australia ............................ PG3390

[51] Int. Cl.[5] ............................................ A21D 8/00

[52] U.S. Cl. ..................................... 426/18; 426/20

[58] Field of Search ................................ 426/18, 20

[56] References Cited

U.S. PATENT DOCUMENTS

| | | | |
|---|---|---|---|
| 1,179,877 | 4/1916 | Wahl | 426/20 |
| 2,023,500 | 12/1935 | Wögerbauer | 426/18 |
| 2,857,280 | 10/1958 | Williams et al. | 426/18 |
| 3,410,692 | 11/1968 | Wutzel | 426/18 |
| 3,438,786 | 4/1969 | Wutzel | 426/18 X |
| 3,527,644 | 9/1970 | Landfried | 426/20 X |
| 3,547,654 | 12/1970 | Olsen | 426/20 |
| 3,615,697 | 10/1971 | Hollenbeck | 426/18 |
| 3,620,173 | 11/1971 | Sternberg | 426/18 |
| 3,875,006 | 4/1975 | Belloc et al. | 426/20 |
| 3,963,835 | 6/1976 | Gryczka | 426/18 |
| 4,234,605 | 11/1980 | Takeuchi | 426/18 |
| 4,238,512 | 12/1980 | Menge | 426/20 |
| 4,353,926 | 10/1982 | Sugihara | 426/20 |

FOREIGN PATENT DOCUMENTS 0021540 2/1981 Japan ................................ 426/18

OTHER PUBLICATIONS

Crueger et al., "Biotechnology: A Textbook of Industrial Microbiology", Science Tech, Inc., Madison, Wis., 1982 (English Translation 1984), pp. 57-60 of English Translation Relied Upon.

London, The Bread Winners Cookbook, 1979, Simon and Schuster; New York, pp. 21-22, 110-112, 120-122, 130-131.

*Primary Examiner*—Joseph Golian

*Attorney, Agent, or Firm*—Ladas & Parry

[57] ABSTRACT

A method of making a fermented milled grain substrate to be used in bakery products is disclosed, the process comprising:

(i) providing a pumpable, aqueous slurry of milled grain;

(ii) delivering a volume of said slurry into a fermentation vessel;

(iii) fermenting said slurry subsequent to an initial inoculation with lactic acid-providing bacteria;

(iv) monitoring a condition of said slurry, which condition is a function of the fermenting of said slurry;

(v) removing a portion of said slurry when said condition reaches a predetermined value;

(vi) adding further slurry of milled grain to said vessel to replace the portion removed, which further slurry is non-sterile and wherein;

(vii) steps (iv), (v) and (vi) are repeated to maintain steady state fermentation conditions within the vessel, with the bacteria levels within the vessel being substantially maintained by bacteria growth within the vessel, without addition of further lactic acid-providing bacteria.

26 Claims, 3 Drawing Sheets

FERMENTATION METHOD

This is a continuation of co-pending application Ser. No. 07/059,109 filed on Jun. 8, 1987 (now abandoned), which is a continuation-in-part of application Ser. No. 06/696,023 filed Jan. 29, 1985 (now abandoned).

The present invention relates to an improved fermentation method, utilizing farinaceous or milled grain products, a process which is particularly useful for bakery products.

A number of bakery type products are produced by either a straight dough procedure or a sponge dough procedure. In each process, the flour is usually fermented in the presence of water and a tactic acid producing bacteria, such as one or more Lactobacillus species, and/or yeast. This fermentation conditions the flour prior to the formation of a dough for subsequent sheeting, proofing and baking. The step is essential for a number of bakery products as the fermentation brings about changes in dough rheology and yields certain flavor components which are critical to a satisfactory baked product. These bakery products include soda crackers and other biscuits, bread type products and a vast array of other baked products.

This initial fermentation step may vary from about 2 hours to about 24 hours depending on the process and the nature of the product required. In the sponge-dough process, the fermentation period is about 18 to 20 hours. The sponge-dough process is used for soda crackers and bread making processes. In the sponge-dough process, about 60 to 70% of the total flour content is fermented prior to the preparation of the dough to be sheeted, proofed and baked.

In the straight dough process, the dough is fermented for a period averaging about 4 to 6 hours. The straight dough process is used in making a number of biscuit type products such as sweet hard biscuits.

In each process, the milled grain, for example, wheaten flour, or wholemeal flour is slurried with water and inoculated with specific micro-organisms, such as a Lactobacillus species, commonly *Lactobacillus plantarum,* and optionally *Saccharomyces cerevisiae* (Baker's yeast), and the slurry is fermented for a predetermined period of time in a fermentation vessel. In the commonly used batch process a predetermined quantity of the ingredients is mixed, transferred to a fermentation vessel and inoculated and then allowed to stand for the fermentation period.

U.S. Pat. No. 2,857,280 describes a batch process for preparing a sponge suitable for making sour dough pancakes. This is a batch process and the fermentation period is said to be between 8 to 48 hours. U.S. Pat. No. 3,963,835 describes a method for making a "sour" flour wherein flour and water are mixed and fermented with a non-toxic Lactobacillus species, which is then dried. Again the fermentation is undertaken as a batch type process and the fermentation time is said to be about 12 to 48 hours. The dried ferment is then used as a replacement for the sponge in the sponge-dough process and is an attempt to save the baker time and labor.

U.S. Pat. No. 3,615,697 again seeks to overcome the problem of long fermentation times by providing the baker with a dried sponge to supply malt flavor and lactic sourness wherein a malt flour is fermented in the presence of a lactic acid producing bacteria. However, long fermentation times are required, such as 1 to 2 days to produce the additives.

U.S. Pat. No. 3,620,173 seeks to overcome the problem by fermenting flour in the presence of yeast under higher than atmospheric pressure.

U.S. Pat. No. 4,353,926 seeks to overcome the problem of long fermentation periods in the preparation of soda crackers by providing a liquid starter. The liquid starter consists of flour and water to which an inoculum of appropriate bacteria is added. Alternatively the inoculum can be a portion of developed liquid starter from a previous batch. The patent indicates that the organism should be present in the quantities sufficient that the liquid starter can be developed within a reasonable time of about 6 to 8 hours. Also, to hasten development the pH of the liquid starter is adjusted to about 5 to suppress undesirable microbial growth. The slurry is allowed to ferment under suitable conditions for between 6 to 8 hours to form the liquid starter which is then used to prepare a liquid sponge which is then subsequently fermented, for example, for about 4 hours. The process disclosed in this patent is still a batch process and still requires large scale batch operations with the concomittent need for floor space and careful planning to avoid wasted ferment.

U.S. Pat. No. 3,547,654 seeks to reduce the fermentation time by providing a concentrated bacterial culture using specific strains of Lactobacillus. The bacterial concentrate is incorporated into a premix and fermented for a period of time, after which it is then mixed with more flour, water, yeast and other materials and fermented for a further Period. However, relatively long fermentation procedures are still required as this concentrated culture tends to obviate the lag phase in bacterial growth which constitutes the first 4 to 6 hours of a typical fermentation procedure. However, the fermentation must still undergo the exponential growth phase where a rapid multiplication of micro-organisms is noted and a stationary phase wherein the growth of micro-organisms is at best constant, due to substrate depletion. It has generally been considered that it is in the stationary phase where certain changes in the flour take place which result in the benefits to the rheology of the dough and the taste components.

Clearly, the batch fermentation process has several disadvantages which have limited the baker or biscuit manufacturer for many years. In particular, the long fermentation period means that a number of large fermentation vessels must always be available if the baker is to prepare the sponge. Deviations from the anticipated usage lead to wastage or limited production runs which are in themselves uneconomical and the large floor area required for the fermentation vessel leads to uneconomical space utilization in factories.

Moreover, in the batch process, there is always a problem with lack of uniformity of the flour which is not necessarily uniform from one batch to another and thus fermentation times and conditions may vary considerably. The quality of the flour as measured by maltose value, starch damage etc, is dependent on the grain from which the flour is derived and thus a variation in climatic or geographical condition will lead to variations in this quality. Substrate variations can lead to quite major variations in the growth rate of the microorganism and consequently the pH of the resultant ferment. This may lead to variations in the quality and rheology of the dough and hence the final product and, unless strict quality control procedures during fermentation and mixing are used these variations can lead to marked increases in cost and time.

In a number of industries, such as the brewing industry and the dairy industry, continuous fermentation technology is used. However, continuous fermentation technology has been put to little use in the bakery industry as is indicated by the prior art. Continuous fermentation procedures in other industries have always required conditions wherein the substrate is sterilized or pasteurized prior to fermentation. It would be anticipated that in using a non-sterile substrate, continuous fermentation over long periods of time without measures being taken to avoid it would lead to undesirable microbial growth. It is well recognized that milled grain products such as wheat and flour, rye flour etc cannot be sterilized and hence it has been considered that continuous fermentation procedures with such substrates would involve a number of insurmountable problems. Lactobacillus are prone to bacteriophage infection and thus it is considered that over a period of time the continuous fermentation would break down due to lack of viability of the lactic acid producing bacteria as a result of bacteriophage infection and/or growth of other undesirable micro-organisms.

Whilst a semi-continuous approach is described by H. Wutzel in U.S. Pat. No. 3,438,786 and 3,410,692, there is no description in the prior art of an attempt to continuously ferment a milled grain substrate in non-sterile form in the presence of a tactic acid producing bacteria under continuous steady state conditions. In U.S. Pat. No. 3,410,692 Wutzel describes a process whereby a fermented predough is removed substantially continuously from a fermentation vessel. However, whilst the fermenting predough is contained in a single container, and whilst the predough components are added periodically to the container, lactic acid forming bacteria and yeast are continually added to the container throughout the course of the fermentation. Therefore, this presupposes that the lactic acid forming bacteria must be continually added to the ferment in order to maintain the bacteria as the dominant and viable bacteria within the ferment. This patent states that the advantages of the invention are achieved by using the micro-organisms required for the fermentation process after separation and isolation from the culture medium and by introducing, after fermentation of the predough has been initiated, such separated and isolated micro-organisms into the fermentation vessel in a predetermined manner. In accordance with U.S. Pat. No. 3,410,692, the lactic acid forming bacteria are introduced into the fermentation apparatus in the total amount of up to 3% (based on a dry content of the bacteria of 30%) calculated for the amount of flour to be processed. This is a significant quantity when scaled up to a typical commercial scale where many thousands of kilos of flour are used daily.

In a further patent, U.S. Pat. No. 3,438,786, Wutzel again describes a process of preparing a sponge wherein predough components are added to a single fermentation vessel substantially continuously whilst the fermented sponge is withdrawn from the vessel under substantially continuous conditions. However, a large proportion of the fermented slurry removed from the ferment is returned to the vessel with the predough components. Therefore, in order to maintain "a uniform state of ripeness" in the fermentation vessel, the sponge is returned at intervals of at least 5 times, mid preferably 10 times the regular feed of fresh sponge ingredients. Therefore, this process of continuously adding fermented slurry back to the fermentation vessel with fresh ingredients is analogous to a continuous mixing process using a liquid starter such as that described by Sugihara in U.S. Pat. No. 4,353,926.

Again, as stated above, these two patents presuppose the necessity for continued addition of a lactic acid producing bacterium to maintain its viability within the fermentation vessel and to maintain the cell count for efficient fermentation. The fermentation is not run as a steady state process.

The present inventors have found that milled grain substrates in non-sterile form can be fermented continuously in the presence of a lactic acid producing bacteria under substantially steady state conditions.

The term "steady state conditions" as used herein means that cell loss as a result of outflow is balanced by the growth of the organism so that the cell count within the fermentation vessel remains substantially constant.

Moreover, this continuous fermentation under steady state conditions is run on a commercial scale. Although some fermentations for metabolite production work well as continuous processes on a small scale, a number of these processes do not scale up for commercial application due to several problems. Many small scale laboratory methods will operate continuously for 20 to 200 hours but do not operate on an industrial scale for at least 500 to 1,000 hours. Maintaining substantially sterile conditions wherein the specific lactic acid producing bacteria is viable and dominant over a long period of time would be considered to be difficult. As indicated earlier, the substrate differs considerably in quality and in some cases when high yielding strains are used reverse mutants arise which can overgrow the production strains in continuous culture. Therefore, the scale up of the present process to commercial conditions is also surprising.

In one form the present invention provides a process for the production of a fermented, milled grain substrate useful in bakery products, said process comprising:

(i) providing a flowable, aqueous slurry of milled grain; and (ii) fermenting a volume of said slurry in a fermentation vessel with one or more strains of lactic acid producing bacteria under suitable conditions, wherein fresh slurry is added to said vessel and fermented slurry removed from said vessel substantially continuously and in such a manner that steady state fermentation conditions are maintained in said vessel.

The process is undertaken as a steady state process and thus, after the initial inoculation, there is no further addition or replenishment of lactic acid bacteria.

Preferably, the continuous fermentation is undertaken at steady state conditions of pH, i.e. pH stat. Alternatively, the steady state condition in the fermentation vessel is achieved by monitoring a particular component of the system such as, for example, tactic acid or maltose, and fresh slurry is introduced and fermented slurry is removed on the basis of the particular component.

Although the flour water mixture may vary considerably, a ratio of 1:6 to 1:14 flour to water, is preferred. More preferably, the ratio is about 1:10 flour to water.

As indicated above, none of the prior art discloses a steady state continuous fermentation process for preparing a fermented milled grain product useful in bakery products. Wutzel in U.S. Pat. Nos. 3,438,786 and 3,410,692 presupposes that the tactic acid producing bacteria had to be constantly added to the fermentation vessel to top up the cell count. In accordance with the present invention, this has been found not to be necessary and steady state conditions can be maintained within the fermentation vessel, on a commercial scale as well as a laboratory scale. Work by the present inventors on the continuous flour fermentation has demonstrated by the use of scanning electron microscopy starch degradation which appears to be caused by *Lactobacilli amylases.* These organisms were able to adhere to starch granules and the glass wall of the fermenter. Further work confirmed the presence of a lactobacilli amylase. The amylolytic activity strongly resembled that of isoamylase (glycogen-6-gluconhydrolase) from *Pseudomonas amyloderamosa* (ATCC 2162) purchased from Hayashibara Biochemical Laboratories in Japan. The organisms responsible for the isoamalyase activity were *Lactobacillus plantarum* and *Lactobacillus fermentum.*

The *L. plantarum* was the organism used as the original single inoculant in the fermenter. The *L. fermentum* was found to be part of the wheaten flour substrate and the organism was able to maintain growth at a similar rate as the inoculated *L. plantarum* during prolonged continuous flour fermentation under steady state conditions.

The characterization of the properties of the isoamylase showed that the major part of the activity was present in cell extracts and on the cell walls of the two Lactobacilli, suggesting that the enzyme was either intracellular or cell-bound. Furthermore, under the experimental conditions used in this work, higher isoamylase activity was induced by the addition of low concentrations of maltose and glutamate to the amylopectin substrate. It became apparent during prolonged running of the continuous flour fermentation that the isoamylase activity derived from lactobacilli was the major factor in maintaining steady-state conditions in the system. The continuing release of glucose and maltose from starch provided the substrate for the growth and maintenance of the originally inoculated *L. plantarum.* Regular biochemical testing on API CH50 kits (Warner-Lambert (Aust) Pty Ltd) indicated that the *L. plantarum* did not change its characteristic sugar fermentation profile over a two year period of continuous flour fermentation. Thus the lactobacillus remains typical in its metabolic functions and remains dominant in the fermentation vessel. Accordingly this ability of the bacteria to degrade starch means that the system is self-supporting and the conditions in the fermentation vessel can be maintained as steady state conditions wherein cell loss as a result of outflow is balanced by the growth of the bacteria. Thus, in order to ensure that the process of the invention can be practiced efficiently the tactic acid producing bacteria preferably is able to demonstrate isoamylase activity. The ability of the bacteria to demonstrate this is easily determined, for example by the following procedure.

Determination of Isoamylase Activity in Lactobacilli

Lactobacilli strains are grown at 37° C. in a medium consisting of (g:l): Peptone (Oxoid) 10, Tryptone (Difco) 10; Tween 80 (Merck) 1; Maltose, 20, Glutamate, 4, Rice Starch, 10; pH 6.5; sterilized by autoclaving for 20 min at 120° C. Cultures are harvested after 48 hours. Disruption of the cells is carried out by sonication for 15 minutes and confirmed microscopically. Disrupted cell suspensions are centrifuged at 12000 g for 20 minutes. Isoamylase activity of disrupted cells, and culture supernatent is carried out by the method of Harada and Koboyashi (Biochem. Biophys. Acta. 212, 1970, 458–469), with slight modifications.

Disrupted cells are taken up in 0.5 ml of 0.5 M acetate buffer (pH 3.5) containing 0.5 ml of 1.0% soluble rice starch and incubated at 40° C. for 1 hour. A 0.5 ml aliquot of the reaction mixture is mixed with 0.5 ml of 0.1 M iodine-potassium iodide and diluted to 12.5 ml with distilled water. Culture supernatant is adjusted (if necessary) to pH 3.5 with 5 M acetic acid. A 0.5 ml aliquot of supernatant is taken and mixed with 0.5 ml of 0.01 M iodine-potassium iodide solution and diluted to 12.5 ml with distilled water.

Both solutions are allowed to stand for 15 minutes at room temperature before centrifugation at 12000 g for 15 minutes. The respective absorbances of the two clarified solutions are then measured at 610 nm using a cuvette at 1-cm light-path against substrate iodine blanks containing aliquots of heat inactivated clarified solution of disrupted cells and culture medium.

Isoamylase activity of the lactobacilli is confirmed with an increase in $A_{610nm}$ for both fractions.

As indicated earlier, prior art methods for the sponge-dough process, which will yield bakery products such as soda crackers, requires an 18 to 20 hour sponge fermentation. This is followed by a 4 to 6 hour proofing period. It has always been considered necessary to utilize these relatively lengthy periods in order to achieve an acceptable texture and flavor in the resulting cracker. The long sponge fermentation allows both yeast and Lactobacillus activity to take place. The doughing-up step involves further mixing of the sponge so that the remaining flour and other ingredients can be added to bring the sponge to dough like consistency. Also, the pH of the dough is adjusted from about 4–4.5 to about 7.0 with sodium bicarbonate. The final 4–6 hour proofing stage mellows the dough and allows a cohesive sheet to be formats during machining.

During the process, the unique flavor of soda crackers is developed and this has been attributed to the mixed fermentation involving both baker's yeast (*Saccharomyces Cerevisiae*) and lactic acid producing species of bacteria, such as *L. plantarum.*

In accordance with one aspect of the present invention, it has been found that the flavor contributing compounds are secondary metabolites excreted by the yeast after about the 12th hour of the sponge fermentation. These metabolites are acidic (oxo-acids), and neutral, deaminated derivatives (fusel oils/esters) of the hydrophobic amino acids, leucine, isoleucine and valine.

Not only has it always been considered that a relatively long fermentation period would be required to obtain these secondary metabolites but also, it was considered that a short fermentation period would not result in the same flavor properties of the dough. Whilst the steady state continuous fermentation yields a sponge that results in products of the same or superior quality as that produced by a batch fermentation, improved results occur with the use of proteolytic enzymes.

In accordance with a further form of the present invention, the inventors have found the addition of at least one type of proteolytic enzyme to the slurry prior to fermentation with yeast, and subsequent incubation of said slurry with said enzyme results in a dough in which the incubation secondary metabolites of the yeast are similar to a 20 hour proofed soda cracker sponge.

Proteolytic enzymes have been described in the prior art for use as dough improvers. For example U.S. Pat. No. 3,875,006 describes a proteolytic enzyme which acts as a dough improver. The enzyme has a pH optimum of 6.8 and an activity greater than 50% in the range of 5.5 to 7:0. U.S. Pat. No. 3,527,644 acknowledges the use of fungal enzyme material derived from *Aspergillus oryzae* as a dough improver. U.S. Pat. No. 1,179,877 evidences that as far back as 1916 proteolytic enzymes have been used in preparing bread doughs. This U.S. patent also describes the use of the proteolytic enzymes in conjunction with a predough fermented in the presence of lactic acid bacteria. However, each of these processes described in this prior art relate to batch type processes and each use the proteolytic enzyme for the purpose of improving dough rheology.

In contrast however, in accordance with this aspect of the invention the proteolytic enzyme is added to the slurry prior to the fermentation with yeast whilst the pH of the ferment is quite low. Accordingly the proteolytic enzymes used in accordance with this aspect of the invention have a pH optimum in the range of from 3.0 to 6.5 more preferably are active below about 5.0 and most preferably have a pH optimum of about 4.0. At this pH, the proteolytic enzymes are not acting as dough improvers but, as discussed above, are considered to liberate certain amino acids and thus contribute to the fermentation with yeast. The proteolytic enzyme acts to liberate amino acids, including the hydrophobic amino acids such as valine leucine and isoleucine. The yeast excretes hydrophobic amino acids as acidic and neutral deaminated cerivatives thereof—namely amyl and isoamyl alcohols which are important flavor components of soda crackers. The present inventors found that addition of hydrophobic amino acids derepressed the yeast amino acid permease system so that yeast uptake of these amino acids is increased and they are metabolized by the yeast to form the important flavor components. Therefore as an alternative to the addition of proteolytic enzyme is the addition of the hydrophobic amino acids prior to or during yeast fermentation.

In accordance with this preferred form of the invention, either fermented slurry resulting from the continuous steady fermentation process of the present invention is transferred to a second fermentation vessel and incubated with one or more proteolytic enzymes prior to fermentation by yeast, or the continuous steady state fermentation with one or strains of tactic acid producing bacteria is conducted in the presence of one or more proteolytic enzymes.

In accordance with a preferred embodiment of the invention, the replacement of water with continuously fermented flour slurry allows all types of cracker biscuits as well as other bakery product to be made without the need for the sponge fermentation step. Moreover the dwell time of the slurry in the fermenter is less than 2 hours during which time sufficient dough modifying effect is imparted to the slurry to allow cream and savoury crackers to be produced from doughs with less than 20 minutes proofing. Also the use of acid protease as a catalyst for flavor development in the slurry fermented in accordance with the process of the present invention allows soda crackers to be made with a straight dough process of 2 hours. This process has obvious advantages over that of Sugihara, U.S. Pat. No. 4,353,926 where a sponge and dough fermentation lasting 6–8 hours is required. Similarly, U.S. Pat. No. 340,692 in the name of Wutzel describes a 10 to 15 hour batch fermentation for the initial ripened sponge followed by a semi-continuous process where sponge components are added together with tactic acid forming bacteria and yeast before the final dough mixing stage. This process when operated in a semi-continuous mode also uses a 50% hourly recycle of fermenting sponge which substantially increases the residence time of the sponge in the fermentation vessel.

In U.S. Pat. No. 343,878 Wutzel describes a substantially continuous sponging process where the sponge is recycled 5 to 10 times the rate of fresh sponge ingredients. This process as well as Wutzel's previous U.S. Pat. No. 340,692 have obvious disadvantages when compared with the present invention in that the residence time of the sponge in the fermenter is limited to a minimum of 5 hours without reducing the final dough proofing time.

Moreover, a further advantage of this continuous process of the present invention is that the continuously withdrawn slurry can be fed directly to continuous mixing apparatus and thus the process is well adapted for the continuous preparation equipment being introduced into bakeries.

Notwithstanding other forms which fall within the broad scope of the present invention several embodiments will now be described by example only and with reference to the examples and accompanying drawings wherein.

Figure 1A:
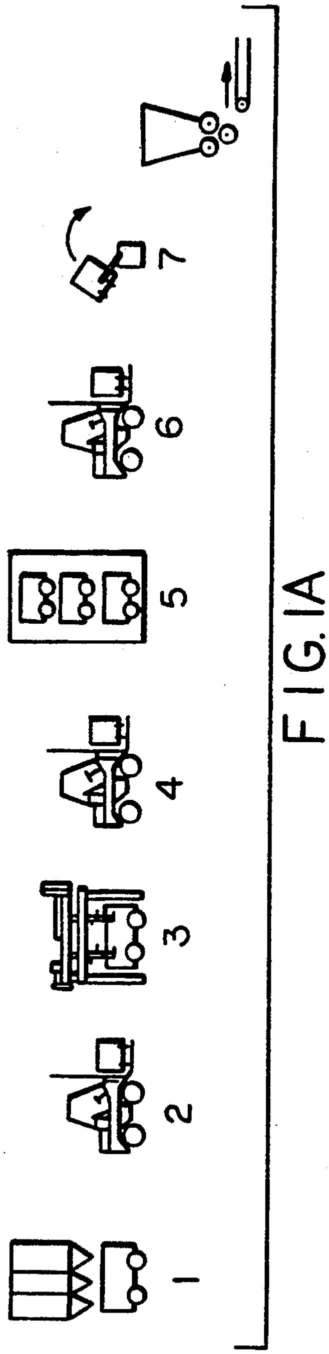
FIG. 1A is a schematic illustration of the prior art straight-dough process.

Turning to FIG. 1A, step 1 represents ingredients being dispensed to a trough in accordance with a predetermined recipe. In step 2 the trough is transferred to a mixer and in step 3 the ingredients are mixed. The dough is then transferred to a proof room in step 4 where it is proofed during step 5 for a time of between 4 to 6 hours. The dough is then transferred in step 6 to a tipper from which it is tipped in step 7 to rollers where it is processed and eventually baked.

Figure 1B:
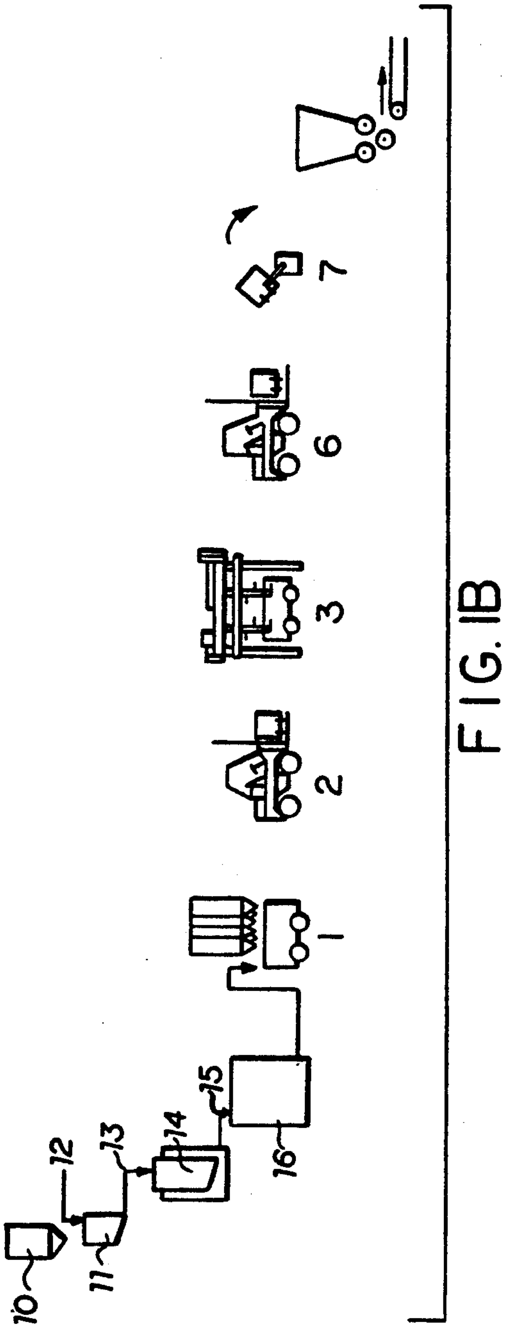
FIG. 1B is a schematic illustration of a straight-dough process in accordance with a preferred embodiment of the present invention.

Turning to FIG. 1B, prior to step 1 where ingredients for the dough are dispensed to a trough in accordance with the predetermined recipe, a portion of the dough is fermented in accordance with the process of the present invention. Flour is dispensed from hopper 10 into a slurry mixing tank 11 into which water is also added via conduit 12. The mixed slurry from mixer 11 then proceeds via conduit 13 to the fermenter 14 wherein it is continuously fermented with a tactic acid producing bacteria and yeast. The fermenter 14 is continuously fed via conduit 13 with fresh slurry whilst conduit 15 ducts fermented slurry to storage tank 16. When required, the fermented slurry is dispensed with other ingredients to a trough in step 1. In step 2 the trough is transferred to a mixer and in step 3 the dough is mixed. Due to the preconditioning of the flour proofing is avoided and accordingly steps 4 and 5 which are the time consuming steps in the process illustrated in FIG. 1A are avoided. Upon mixing the dough is transferred to a tipper in step 6 and then transferred to rollers in step 7 for subsequent processing and baking.

Figure 2A:
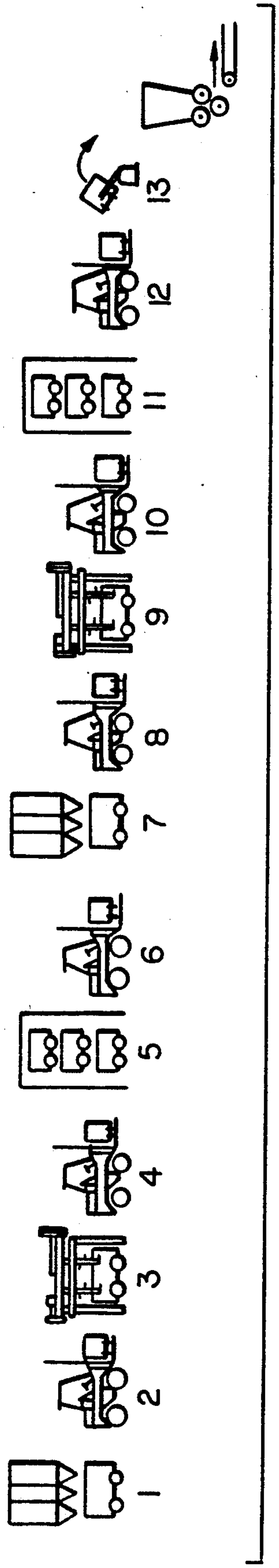
FIG. 2A is a schematic illustration of a sponge-dough process in accordance with the prior art for the production of soda crackers.
Figure 2B:
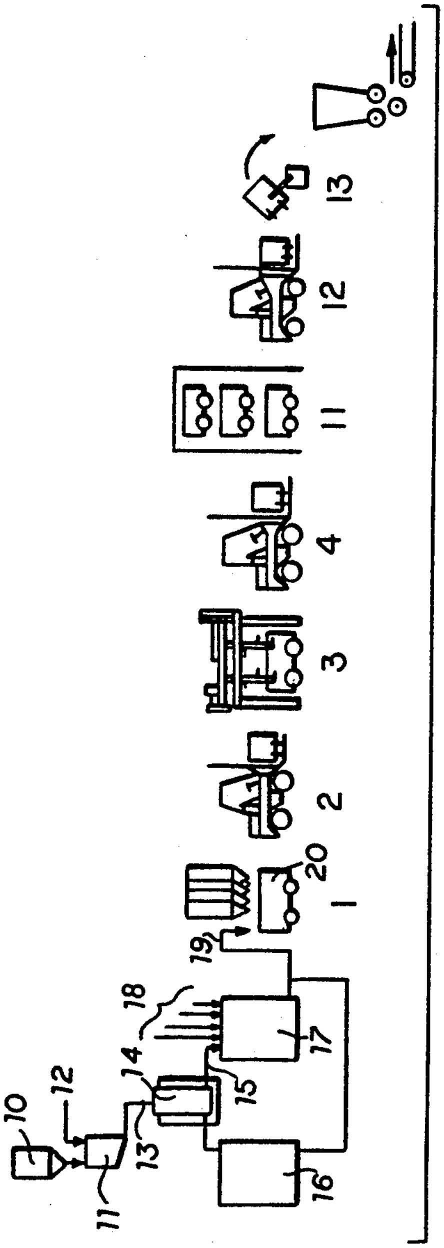
FIG. 2B is a schematic illustration of a sponge-dough process in accordance with a preferred embodiment of the present invention.

Turning to FIGS. 2A and 2B, in FIG. 2A, ingredients for the sponge are dispensed to a trough in step 1, transferred to mixer, step 2, and the sponge-dough is mixed in step 3. After mixing the dough it is then transferred in step 4 to a proofing room and in step 5 the dough is fermented in the presence of a tactic acid producing bacteria for approximately 18 to 20 hours. After the fermentation period, the sponge is transferred to ingredient dispensers where the remaining ingredients are added to the trough which is then transferred in step 8 to a mixer 9 where the remaining ingredients are mixed with the fermented sponge and the trough is then transferred to a proof room wherein the dough is proofed in step 11 for a period of about 4 hours. The trough containing the proofed dough is then transferred to tipper in step 12 and the dough is then tipped to rollers 13 where it is subsequently processed and baked.

In accordance with the process depicted in FIG. 2B, prior to step 1, flour is dispensed from a hopper 10 to a mixer 11 into which water is also fed via conduit 12 in a predetermined relationship. An aqueous slurry of the flour is formed. The slurry is then transferred to the fermenter 14 via conduit 13 where it is fermented in the presence of a tactic acid producing bacteria. The fermented slurry is continuously removed from the fermenter 14 via conduit 15 and may be taken either to storage tank 16 or 17. Storage tank 17 is adapted for the incubation of said slurry with yeast and/or with one or more proteolytic type enzymes. Tank 17 is provided with conduits 18 for the addition of yeast slurry, dextrose, bicarbonate soda, and proteolytic enzyme. The tank is also provided with agitating means (not shown) to maintain relative homogeneity in the slurry during incubation. If desired, the fermented slurry is transferred to tank 17 and an acid protease is added and the slurry incubated with said protease for a suitable period, such as up to about 3 hours. The pH is then adjusted to between 6.5 to 7.5 and yeast added. After the appropriate incubation period, the yeast modified ferment from tank 17 or the straight ferment from tank 16 is transferred via conduit 19 to a trough 20. Other ingredients in accordance with the recipe are added to the trough and the trough transferred in step 2 to a mixer where it is mixed in step 3 to a homogeneous dough. The dough is then transferred in step 4 to a proof room where it is proofed for a period of about 1.5 to 2 hours which corresponds generally with step 11 of the prior art process depicted in FIG. 2A. In step 12, the proofed dough is then transferred to a tipper and the dough is then tipped to rollers and other dough processing equipment for subsequent sheeting and baking.

In accordance with the above diagrams it can be seen that the process in accordance with the present invention substantially reduces the process steps and time required to condition and/or proof the dough prior to sheeting and baking.

Figure 3:
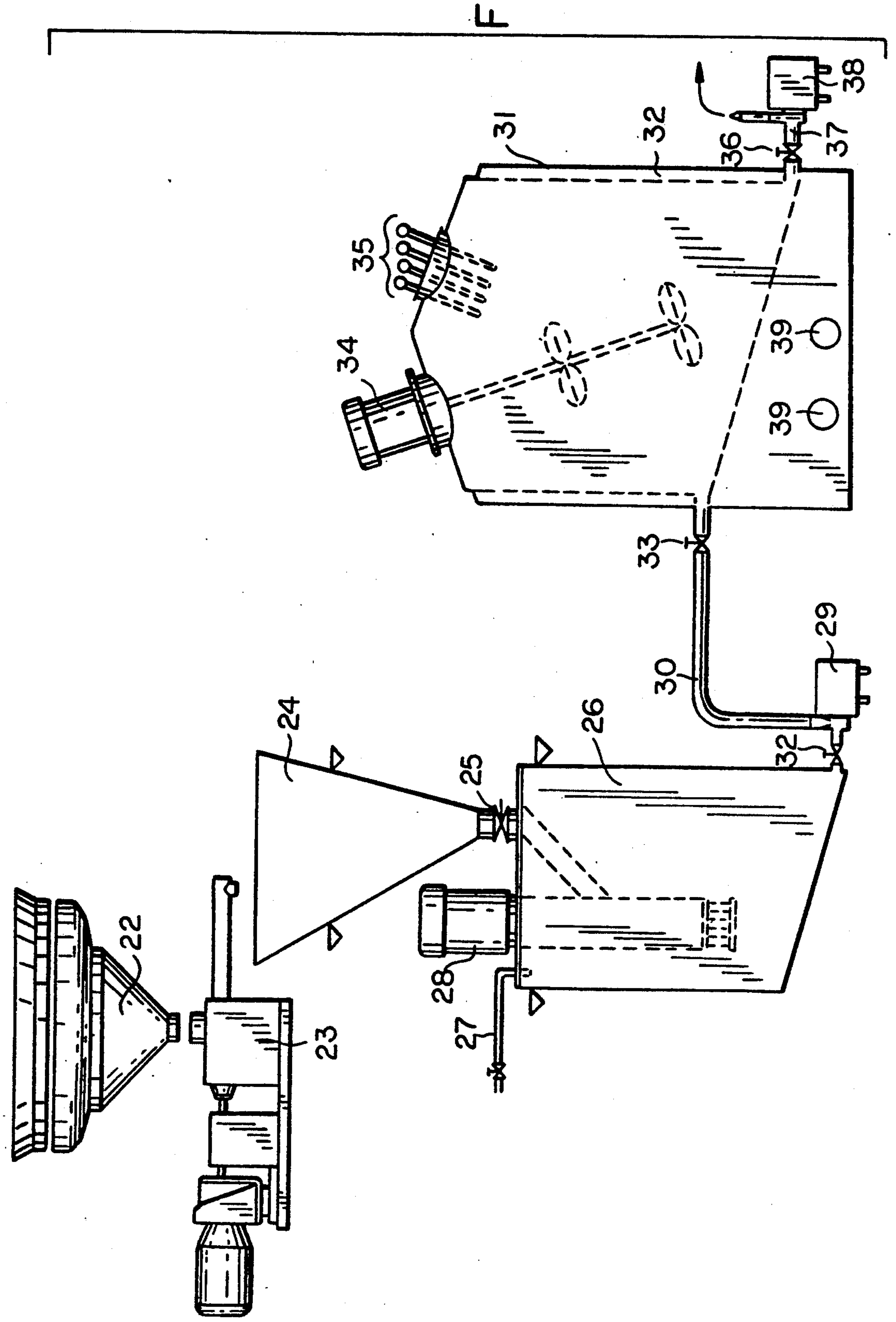
FIG. 3 is a schematic illustration of a feeder/mixer/fermenter combination useful in the process of a preferred embodiment of the present invention.

Turning to FIG. 3, there is shown a feeder/mixer/fermenter apparatus in combination which apparatus is useful in accordance with the process of the present invention.

A milled grain substrate such as wheaten flour, wholemeal flour, rye flour or mixtures thereof is transferred to a hopper 22 of a two speed volumetric screw feeder 23 which delivers a predetermined quantity of flour to dump hopper 24. The flour passes from hopper 24 via dump valve 25, which is opened at predetermined intervals, into the mixing tank 26. Conduit 27 delivers metered amounts of water to tank 26 so that a slurry is formed. Preferably the ratio of flour to water is about 1:10 but ratios of 1:6 to 1:14 may be utilised. The proportions will vary with the type of farinaceous material used and in line with the requirements of the process. However it is preferred that a generally free flowing slurry is obtained so that the slurry can be pumped and can be freely circulated in the fermentation vessel to achieve homogeneity. A mixer 28 such as a "Yetmix" mixer is provided in mixing tank 26 to mix the combination of flour and water to a homogeneous slurry.

Initially a predetermined volume of the slurry is pumped by slurry pump 29 through conduit 30 to the continuous fermenter 31. Valves 32 and 33 are provided in conduit 30 and are operated in conjunction with pump 29 by a controller as will be explained hereinafter.

Initially a predetermined volume of the slurry is fed to the fermenter 31 and an inoculum comprising lactic acid bacteria, preferably *Lactobacillus plantarum* and/or other Lactobacillus species is introduced into the fermenter 31.

The cell count of the inoculum is not critical to the invention but it is preferred that the inoculum provides a cell count in the fermenter 31 which generally approximates the steady state cell count of the fermentation vessel during operation. This will reduce the work-up time in the fermenter 31 upon commencement of fermentation.

Preferably, the lactic acid producing bacteria is *Lactobacillus plantarum.* Various strains of this bacteria are commercially available to the baker, e.g. marketed by "Microlife" under the trade name of "Sardo S.C." Alternatively the baker may have his own strain developed or isolated. As indicated previously the bacteria should demonstrate isoamylase activity.

Preferably, the temperature of the fermentation medium is maintained at a temperature conducive to the growth of the micro-organism species used in the fermentation medium. In a preferred form of the invention, the temperature of the fermentation medium is maintained at about 35° C. However, the temperature of the fermentation medium will vary with the nature of the micro-organisms used in the fermentation process. *L. Planitarum* is generally active in a temperature range of about 15° to 42° C. If the fermentation is conducted in the presence of yeast, which is generally active in the temperature range of from 20° to 35° C., then the preferred temperature of fermentation will be about 33° C.

The temperature in the fermenter is maintained at a relatively constant rate by means of oil jacket 32 in which oil is circulated by oil heaters 39. Homogeneity of the slurry during fermentation in vessel 31 is maintained by agitator 34. It should be noted that agitator 34 cannot agitate the slurry too vigorously as this can cause excessive frothing.

It is an underlying notion of the continuous fermentation process of the invention that the fermentation is conducted under steady state conditions when the dilution rate i.e. the rate at which fermented slurry is removed and fresh slurry is replaced equals the specific growth rate of the micro-organism.

In this embodiment of the invention, the fermentation is run as a pH stat system and probes 35 are provided which monitor select conditions in the fermentation vessel such as pH, temperature and levels. The probe monitoring pH is connected to a controller (not shown) which in turn controls valves 32/33 which introduce fresh slurry into the fermenter via conduit 30 and also controls valve 36 which opens conduit 37 from which fermented slurry is pumped via ferment pump 38 to storage tanks. The influx of fresh slurry and efflux of fermented slurry is controlled by reference to the pH of the fermentation fluid. In this form of the invention the fermentation medium which is continuously stirred is monitored by means of a pH electrode 35 in the fermentation medium. Once the fermentation medium reaches a predetermined pH, such as about pH 3.9, the controller (not shown) activates valve 37 and pump 38 so that fermented slurry is removed from the fermenter. The inlet pump 29 and valves 32 and 33 are activated also so that the slurry is restored to the original volume. The volume may be monitored by means of a probe 35 which monitors the level in the fermentation tank 31. Once the original volume is achieved, pumping is then stopped and fermentation continues until again the pH of the fermentation fluid reaches a predetermined pH and again the pumps and valves are activated by the controller.

Alternatively, the pH of the system may be monitored so that the pumps may be set at predetermined time intervals and volumes in order that fresh slurry is introduced via conduit 30 and fermented slurry is removed via conduit 37 in a substantially continuous manner. In a preferred embodiment of the present invention, the steady state condition is reached at a pH of about 3.9 which corresponds to a growth rate of *L. plantarum* to give the steady state conditions of $3 \times 10^8$ cells/ml.

In an alternative embodiment of the invention, the steady state conditions may be monitored by means of a chemo-stat monitor, in which for example the viscosity or maltose is monitored. This system works on similar principles to the pH stat system described above.

As an example in the process of the present invention with 1:10 flour slurry dilution rates of about 50–60% per hour can be achieved. This means that the average dwell time in the fermenter is about 1.5–2 hours as compared to a 20 hour fermentation period for batch processes in the sponge-dough procedure in the biscuit industry. In a straight dough process this will reduce the rest period from 4 hours to a minimum period.

In another embodiment of the present invention, the micro-organism used in the fermentation vessel may also include a yeast such as *Saccharomyces cerevisiae.* Preferably the yeast is immobilised in the fermenter to prevent the yeast from being washed from the fermenter as the growth rate of the yeast at about pH 3.9 is generally less than the growth rate of the *L. plantarum.* The yeast may be immobilized, for example, in a polymeric matrix, in alginate beads or gum carrageenan. Provision is made to prevent the immobilized yeast being washed from the vessel (e.g. screens on the outlet conduit(s).

The process of the present invention has been found to have several advantages. The major advantage thereof is that continuity of fermentation under optimal conditions leads to greater efficiency than that obtained with batch fermentation processes. It has also been found that the high degree of control which the process allows over the fermented liquid leads to more reproducible dough rheology and a more consistent end product. It has also been noted that no significant contamination of the fermented fluid with other micro-organisms results, which is surprising in light of the fact that the substrate is non-sterile. This is believed to be in part due to the low pH and high degree of an anaerobiosis, (low redox potential) as well as the high dilution rates used in the fermenter. This leads to a further application of the process in other areas apart from the bakery industry.

In many of the poorer countries in the world fermentation of a milled grain substrate is used to produce certain foods or beverages such as Ogi, Kaffir beer or Kvass. These beverages often contain high levels of undesirable micro-organisms some of which produce toxic substances such as aflatoxins. The ability of the process of the present invention to ferment a non-sterile milled grain substrate without significant contamination by undesirable micro-organisms makes the process applicable to the production of such beverages without significant levels of toxic substances resulting from contaminant microbial fermentation.

Moreover, the continuity of supply of the fermented flour has the added advantage that the fermentation process is more adaptable to a continuous mixing process prior to proofing and baking, than batch procedures.

Although continuous mixing processes are known, they are not widely used in the bakery industry due to the batch type nature of the fermentation process. With the use of a continuous fermentation process, the fermented slurry can be fed into the mixer in regulated amounts as well as other adjuvants and in this way the advantages of the continuous mixing process are utilised.

Several preferred forms of the invention will be further illustrated in the following Examples:

EXAMPLE 1

In this Example a 1:10 mixture of flour and water was inoculated with 170 g of *Lactobacillus plantarum* (SARDO, Registered Trade Mark, S.C. Microlife, Fla.) and premixing was continued until the fermentation vessel was filled to the operating level of 100 liters. The fermenter was programmed to harvest at pH 3.9 and the operating temperature was set at 35° C. Under these conditions of continuous growth, the doubling time of the organism was found to be 90 minutes, which on a theoretical basis, allows a steady state dilution rate of 0.6. The actual dilution rate, under prolonged pH-stat operating conditions was found to be 0.57 (i.e. 57 liters per hour). The *L. plantarum* numbers remain constant at $3 \times 10^8$ cells per gram of fermented flour.

EXAMPLE 2

It was discovered, unexpectedly in view of the prior art, that the replacement of water by 1:10 slurry of continuously fermented flour produced cream and savoury cracker doughs which did not require the conventional proof-time of 4–6 hours. The doughs produced by the method of the present invention could be sheeted and baked immediately after mixing, without concomitant loss in quality of the crackers. It was also noted that optimal dough development could be achieved by using the flour to water concentration range between 1:8 to 1:12 although ratios of between 1:6 to 1:14 were acceptable. The tensile energy absorption of the dough sheet and its resistance to extension, when measured by the Instron Universal Tester (Model 4301), were found to increase with flour concentrations outside the stated range.

In this Example, the following formulation was used in the preparation of cream cracker dough:

| | Kg |
|---|---|
| Flour | 100.00 |
| Fat | 15.00 |
| Sugar | 0.50 |
| Salt | 1.75 |
| Fermented flour (slurry) | 30.00 |
| Soda | 0.40 |
| Yeast | 0.30 |

The temperature of the fermented flour on addition to the dough was 22°±3° C.

A horizontal drum mixer was used to mix the dough at 30 rpm for 300 revolutions. The temperature of the dough after mixing ranged from 26°-30° C. and the pH was 6.4. No proof-time was necessary and the doughs were sheeted within 30 minutes of mixing. The crackers produced by the fermentation method of the present invention were found to be uniform in taste and quality and of a quality that was at least equal to that of crackers made by the prior art processes as indicated by the following evaluation.

Sample: Cream Cracker - Continuous Fermentation
Origin of Sample: Arnott Brockhoff Guest, Burwood, Victoria
Sample Details: Old Standard vs Product of Example 2 (Trial)
RESULTS:
Panelists = 22

| | Standard $\bar{x}$ | Trial $\bar{x}$ |
|---|---|---|
| Appearance | 4.4 | 4.7 |
| Texture Hardness | 5.3 | 5.4 |
| Texture Crispness | 5.4 | 5.8 |
| Internal Structure | 4.5 | 4.2 |
| Flavour Strength | 4.9 | 4.7 |
| Sweetness | 2.4 | 2.4 |
| Saltiness | 5.1 | 5.0 |
| Acceptability | 4.5 | 4.6 |
| N.B: | *significant difference at 5.0% level<br>**significant difference at 2.5% level<br>***significant difference at 0.1% level | |

COMMENTS:

Appearance:

| | |
|---|---|
| Standard: | Pale bake (5), broken blister (3), uneven colouring (3), overbaked (2) |
| Trial: | Overbaked (4), golden (3), darker (3), poor, colour (2), uneven colour (2) |

Texture:

| | |
|---|---|
| Standard: | Hard (6), crisp (4), open (3) |
| Trial: | Hard (6), crisp (4), open (3) |

Flavour:

| | |
|---|---|
| Standard: | Salty (10), buttery (3) |
| Trial: | Salty (8), burnt (3), overbaked (2), oily (2), buttery (2) |

EXAMPLE 3

In the Example, fermented flour with 1:10 flour to water concentration was used to produce savoury crackers.

A dough mixture of the following formulation was prepared:

| | Kg |
|---|---|
| Flour | 100.00 |
| Fat | 6.50 |
| Cheddar Cheese | 25.00 |
| Salt | 1.20 |
| Fermented flour (slurry) | 36.00 |

-continued

| | Kg |
|---|---|
| Soda | 0.30 |
| Yeast | 0.60 |
| Fungal Protease | 0.03 |
| Flavours | 0.60 |

The temperature of the fermented flour on addition to the doughs was 22°±3° C.

The doughs were mixed in a vertical spindle mixer at 25 rpm for 160 revolutions. The temperature of the doughs at mixing ranged from 26°-28° C., and the pH was 5.8.

No proof-time was necessary and the doughs were sheeted immediately after mixing. The savoury crackers produced by the fermentation method of the present invention were more uniform in taste and quality than the conventionally made product. Sensory evaluation of this Example is given below.

Sample: Savoury Shapes
Origin of Sample: Arnott Brockhoff Guest, Burwood, Victoria
Sample of Details: Old Standard vs Product of Example 3
Panelists = 20

| | Standard $\bar{x}$ | Trial $\bar{x}$ |
|---|---|---|
| Appearance | 5.98 | 6.37 |
| Texture Hardness | 5.17 | 5.95** |
| Texture Crispness | 4.91 | 5.73 |
| Internal Structure | 5.27 | 4.63 |
| Flavour Strength | 5.98 | 6.90* |
| Sweetness | 2.84 | 2.92 |
| Saltiness | 6.04 | 6.22 |
| Rancidity | 2.17 | 2.25 |
| Acceptability | 5.90 | 6.39 |
| N.B: | *significant difference at 5.0% level<br>**signifcant difference at 2.5% level<br>***significant difference at 0.1% level | |

COMMENTS:

Appearance:

| | |
|---|---|
| Standard: | Lighter base (6), blistered/puffy (3) |
| Trial: | Golden (3) |

Texture:

| | |
|---|---|
| Standard: | Softer (7), open (3) |
| Trial: | Crisp (4), dense (3) |

Flavour:

| | |
|---|---|
| Standard: | Salty (5), Savoury (5), Sesame (3), Cheesey (3) |
| Trial: | Salty (5), Savoury (4), Sesame (3), Cheesey (3) |

EXAMPLE 4

In the Example, 0.05% (w/v) acid protease (Pfizer, N7) was added to 1000 liters of fermented flour at a pH of 3.9 contained in a bulk storage vessel. The slurry (1:10 concentration of flour to water) was digested with continuous agitation over a period of 3 hours at a temperature of 25°±3° C. During this period 8.2 micro moles (um) of Leucine, 18.2 um of isoleucine, and 9.0 um of valine were released into the fermented slurry. After digestion, 1% (w/v) of dextrose was added and the pH of the fermented four was adjusted to 6.5 with sodium bicarbonate. Slurried baker's yeast was also added to give a concentration of $5\times10^7$ cells per gram in the fermented flour. The secondary yeast fermentation was allowed to proceed over a period of 3 hours after which the concentration of oxo-acids, fuel oils and their esters, was found to be similar to a 20 hour proofed soda cracker sponge.

The method of straight dough soda cracker (Type 1) production will be further illustrated by reference to the following Example:

| | Kg |
|---|---|
| Flour | 100.00 |
| Fat | 7.50 |
| Salt | 1.30 |
| Fermented flour (acid protease digested and -ex secondary yeast fermentation) | 40.00 |
| Yeast food | 0.15 |
| Dextrose | 0.15 |
| Soda | 0.50 |
| Yeast (compressed) | 0.50 |

The soda cracker straight dough described in this Example has a final pH of 6.5.

The temperature of the fermented flour on addition to the dough was 25°±3° C.

The straight doughs were mixed in a vertical spindle or horizontal drum mixer at 25 and 30 rpm respectively for 200 revolutions. The temperature of the doughs after mixing range from 26°-30° C. and the pH was 6.8-7.0.

Proofing was carried out for 1.5-2 hours at a temperature of 30° C. The soda crackers using doughs produced by the method of the present invention were uniform in taste and quality and compared favourably with product made by the prior art process as shown by the sensory evaluation outlined below.

Sample: Salada Cracker - Continous Fermentation
Origin of Sample: Arnott Brockoff Guest, Burwood, Victoria
Sample Details: Old Standard vs Product of Example 4
RESULTS:
Panelists = 23

| | Standard $\bar{x}$ | Trial $\bar{x}$ |
|---|---|---|
| Appearance | 4.85 | 4.82 |
| Texture Hardness | 4.47 | 4.43 |
| Texture Crispness | 5.49 | 5.76 |
| Internal Structure | 5.17 | 4.74 |
| Flavour Strength | 4.02 | 4.57 |
| Rancidity | 2.42 | 2.51 |
| Acceptability | 4.83 | 4.42 |
| N.B: | *significant difference at 5.0% level<br>**significant difference at 2.5% level<br>***significant difference at 0.1% level | |

COMMENTS:

Appearance:

| | |
|---|---|
| Standard: | Lighter (8), darker (3), pale bottom (3) |
| Trial: | Brown (3), darker (4), blistered (2) |

Texture:

| | |
|---|---|
| Standard: | Crisp (7), hard (2), open (3), softer (2) |
| Trial: | Crisp (8), hard (3), open (2), flaky (2) |

Flavour:

| | |
|---|---|
| Standard: | Bland (3), fresh (2), salty (7), sour (2) |
| Trial: | Burnt (4), bland (3), stale (2), salty (3), sour (2) |

EXAMPLE 5

This Example describes the formulation of a proteolytic enzyme modified soda cracker (Type 2) dough.

| | Kg |
|---|---|
| Flour | 100.00 |
| Fat | 12.00 |
| Salt | 1.50 |
| Fermented flour (acid protease digested) -ex secondary yeast fermentation | 42.00 |
| Fungal Protease | 0.06 |
| Dextrose | 0.15 |
| Soda | 0.50 |
| Yeast (compressed) | 0.50 |

The temperature of the fermented flour on addition to the doughs was 25°±3° C.

The fungal protease used is active at the range of pH 6.5-6.8 (whereas N7 is not). This protease acts as a further modifying agent.

The straight doughs were mixed in a vertical spindle or horizontal drum mixer at 25 and 30 rpm respectively for 300 revolutions.

The temperature of the doughs after mixing ranged from 28°-32° C., and the pH of the doughs at set was 6.5-6.8.

Proofing was carried out for 1.5-2 hours at a temperature of 35° C. The soda crackers produced by the method were more uniform in taste and quality than products made by the prior art process. The sensory evaluation of biscuits prepared in accordance with the invention and compared with the prior process is outlined below.

Sample: Saltine Cracker - Continuous Fermentation
Origin of Sample: Arnott Brockhoff Guest, Burwood, Victoria
Sample Details: Old Standard vs Product of Example 5
RESULTS:
Panelists = 22

| | Standard $\bar{x}$ | Trial $\bar{x}$ |
|---|---|---|
| Appearance | 4.92 | 5.63** |
| Texture Hardness | 5.39 | 5.04 |
| Texture Crispness | 4.62 | 5.10** |
| Internal Structure | 4.70 | 4.82 |
| Flavour Strength | 3.92 | 4.76*** |
| Sweetness | 2.95 | 2.98 |
| Saltiness | 6.15 | 6.17 |
| Rancidity | 2.12 | 2.31 |
| Acceptability | 4.20 | 4.62* |
| N.B: | *significant difference at 5.0% level<br>**significant difference at 2.5% level<br>***significant difference at 0.1% level | |

COMMENTS:

Appearance:

| | |
|---|---|
| Standard: | Pale, underbaked (14), poor development (2) |
| Trial: | Golden brown (11), slimey, oily (6), good development (2), more attractive (2). |

Texture:

| | |
|---|---|
| Standard: | Hard bite (3), close texture (3), doughy mouthful (2) |
| Trial: | Open texture (2), flaky/friable (2) |

Flavour:

| | |
|---|---|
| Standard: | Bland (10), salty (4), yeasty (3) |
| Trial: | More bake flavour (10), salty (3) |

We claim:

1. A process for the production of a fermented milled grain substrate useful in bakery products, said process comprising:

(i) providing a pumpable, aqueous slurry of milled grain;
(ii) delivering a volume of said slurry, into a fermentation vessel;
(iii) fermenting said slurry subsequent to an initial inoculation with lactic acid-producing bacteria;
(iv) monitoring a condition of said slurry, which condition is a function of the fermenting of said slurry;
(v) removing a portion of said flurry when said condition reaches a pre-determined value;
(vi) adding further slurry of milled grain to said vessel to replace the portion removed, which further slurry is non-sterile and wherein;
(vii) steps (iv), (v) and (vi) are repeated to maintain steady state fermentation conditions within the vessel, with the bacteria levels within the vessel being substantially maintained by bacteria growth within the vessel, without addition of further lactic acid-producing bacteria.

2. The process of claim 1, wherein said lactic producing bacteria demonstrates isoamylase activity.

3. The process of claim 1, wherein said slurry comprises a water and flour mixture in a ratio of one part flour to between 6 and 14 parts water on a weight basis.

4. The process of claim 1, wherein the weight ratio of flour to water is about 1:10.

5. The process of claim 1, wherein said lactic acid producing bacteria is a Lactobacillus species.

6. The process of claim 5, wherein said bacteria is *Lactobacillus plantarum.*

7. The process of claim 1, wherein the fermentation is conducted in the presence of yeast.

8. The process of claim 1, wherein said fermented slurry is transferred to a second fermentation vessel and incubated with one or more proteolytic enzymes prior to fermentation by yeast.

9. The process of claim 1, wherein step (iii) is conducted in the presence of one or more proteolytic enzymes.

10. The process of claim 8, wherein said proteolytic enzyme is active at a pH below about 5.

11. The process of claim 8, wherein said proteolytic enzyme has a pH optimum of about 4.

12. The process of claim 1, wherein one or more amino acids selected from valine, leucine and isoleucine are added to the slurry prior to or during fermentation by yeast.

13. The process of claim 1, which further comprises the step of continuously mixing the fermented slurry removed from the fermentation vessel with additional components to produce the dough.

14. A process for a production of crackers comprising:
i) providing a pumpable aqueous slurry of flour;
ii) fermenting a volume of said slurry in a fermentation vessel with *Lactobacillus plantarum* under suitable conditions, wherein fresh slurry is added to said vessel and fermented slurry is removed from said vessel substantially continuously and in such a manner that steady state fermentation conditions are maintained in said vessel and so as to give an average residence time in said vessel of about two hours; and wherein there is no further addition or replenishment of *Lactobacillus plantarum* to said vessel after an initial inoculation;
iii) mixing said fermented slurry with other dough components to make a cracker dough;
iv) sheeting and baking said dough to form crackers.

15. The process of claim 14, wherein said *Lactobacillus plantarum* demonstrates isoamylase activity.

16. A process for a production of crackers comprising:
i) providing a pumpable aqueous slurry of flour;
ii) fermenting a volume of said slurry in a fermentation vessel with *Lactobacillus plantarum* under suitable conditions, wherein fresh slurry is added to said vessel and fermented slurry is removed from said vessel substantially continuously and in such a manner that steady state fermentation conditions are maintained in said vessel and so as to give an average residence time in said vessel of about two hours and wherein there is no further addition or replenishment of *Lactobacillus plantarum* to said vessel after an initial inoculation with said Lactobacillus;
iii) incubating said fermented slurry with yeast under suitable conditions;
iv) mixing the slurry resulting from step iii) with the other dough components to form a soda cracker dough;
v) proofing said dough for a period of one to three hours under suitable conditions;
vi) sheeting and baking said proofed dough to produce a soda cracker, and wherein
a) prior to the end of step iii), said slurry is incubated in the presence of an acid protease at the pH of below about 5 to release free amino acids into said slurry; or
b) prior to the end of step iii) said slurry has added to it hydrophobic amino acids selected from valine, leucine and isoleucine.

17. The process of claim 16 wherein said fermented slurry is incubated with said acid protease prior to incubating said slurry with yeast.

18. The process of claim 16, wherein said *Lactobacillus plantarum* demonstrates isoamylase activity.

19. The process of claim 16, wherein the pH of step vi) is about 4.0.

20. The process, as in claim 16 wherein said slurry is not sterilized.

21. A process for the production of crackers comprising:
(i) providing a pumpable, aqueous slurry of milled grain;
(ii) delivering a volume of said slurry into a fermentation vessel;
(iii) fermenting said slurry subsequent to an initial inoculation of *Lactobacillus plantarum;*
(iv) monitoring a condition of said slurry, which condition is a function of the fermenting of said slurry;
(v) removing a portion of said flurry when said condition reaches a pre-determined value, and so as to give an average residence time in said vessel of about two hours;
(vi) adding further slurry of milled grain to said vessel to replace the portion removed, which further slurry is non-sterile; and wherein;
(vii) steps (iv), (v) and (vi) are repeated to maintain steady state fermentation conditions within the vessel, with the bacteria levels within the vessel being substantially maintained by bacteria growth within the vessel, without addition of further lactic acid-producing bacteria;
(viii) mixing said fermented slurry of step (v) with other dough components to make a cracker dough;
(ix) sheeting and baking said dough to form crackers.

22. The process of claim 21, wherein said *Lactobacillus plantarum* demonstrates isoamylase activity.

23. A process for the production of soda crackers comprising:

(i) providing a pumpable, aqueous slurry of milled grain;

(ii) delivering a volume of said slurry into a fermentation vessel;

(iii) fermenting said slurry subsequent to an initial inoculation of *Lactobacillus plantarum;*

(iv) monitoring a condition of said slurry, which condition is a function of the fermenting of said slurry;

(v) removing a portion of said flurry when said condition reaches a pre-determined value, and so as to give an average residence time in said vessel about two hours;

(vi) adding further slurry of milled grain to said vessel to replace the portion removed, which further slurry is non-sterile, and wherein;

(vii) steps (iv), (v) and (vi) are repeated to maintain steady state fermentation conditions within the vessel, with the bacteria levels within the vessel being substantially maintained by bacteria growth within the vessel, without addition of further lactic acid-producing bacteria;

(vii) incubating said fermented slurry of step (v) with yeast under suitable conditions;

(ix) mixing the slurry resulting from step (viii) wit the other dough components to form a soda cracker dough;

(x) proofing said dough for a period of one to three hours under suitable conditions;

(xi) sheeting and baking said proofed dough to produce a soda cracker, and wherein a) prior to the end of step (viii), said slurry is incubated in the presence of an acid protease to the pH of below about 5 to release free amino acids into said slurry; or b) prior to the end of the step (viii) said slurry has added to its hydrophobic amino acids selected from valine, leucine and isoleucine.

24. The process of claim 23, wherein said fermented slurry is incubated with said acid protease prior to incubating said slurry with yeast.

25. The process of claim 23, wherein said *Lactobacillus plantarum* demonstrates isoamylase activity.

26. The process of claim 23, wherein the pH of step (xi) is about 4.0.

* * * * *